Patented June 22, 1937

2,084,528

UNITED STATES PATENT OFFICE 2,084,528

PROCESS FOR THE MANUFACTURE OF ISATIN-α-HALIDES HALOGENATED IN THE NUCLEUS

Eduard Kambli, Basel, Switzerland, assignor to the firm of Society of Chemical Industry in Basle, Basel, Switzerland No Drawing. Application March 26, 1934, Serial No. 717,535. In Switzerland April 8, 1933

5 Claims. (Cl. 260—47)

This invention relates to the manufacture of isatin-α-halides which are halogenated in the nucleus by treating with an halogenating agent an isatin-α-halide of the general formula

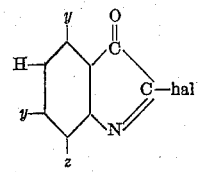

wherein at least one $y$ is a member of a group of substituents consisting of alkoxy and alkyl mercapto, wherein the alkyl radical belongs to the lower aliphatic series, or methyl, and $z$ is a member of a group of substituents consisting of alkoxy or alkyl mercapto, wherein the alkyl radical belongs to the lower aliphatic series, or halogen.

Isatin-α-halides of the above formula are, for instance, the α-chloride or α-bromide of 4- or 6- or 7-methylisatin, of 4:6- or 4:7-dimethylisatin, of 4:6:7-trimethylisatin, of 4- or 6- or 7-methoxy- or ethoxy-isatin, of 4-methyl-7-halogenisatin, of 4:6- or 4:7-dimethoxy- or diethoxy-isatin, of 4:6:7-trimethoxy-isatin, of 4- or 6- or 7-alkyl-mercapto-isatin, of 4-methyl-6- or 7-ethoxy-isatin, of 4:6-dimethyl-7-methoxyisatin.

The treatment of the isatin-α-halide with the halogenating agent may be conducted in various ways, for example in the presence of an indifferent solvent or diluent, for instance benzene, chlorobenzene, nitrobenzene, tetrachlorethane or chloroform.

As an halogenating agent there may be used, for example, chlorine, bromine or sulfuryl chloride in presence or absence of a halogen carrier, for instance iodine, antimony pentachloride or iron or an iron salt; particularly good results in respect of the yield of the nuclear chlorinated isatin-α-halide are obtained when sulfuryl chloride is used as the halogenating agent.

The following examples illustrate the invention, the parts being by weight:—

Example 1

19,1 parts of 4-methyl-7-methoxyisatin of the formula

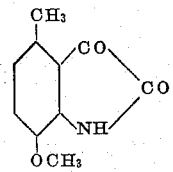

are converted into 4-methyl-7-methoxyisatin-α-chloride by heating them for half-an-hour at 80–85° C. with 22 parts of phosphorus pentachloride in 600 parts of chlorobenzene. To the mass produced, after it has been cooled to 0° C., there are added 16 parts of bromine and the whole is heated in the course of 4–5 hours to 40° C.

The 4-methyl-5-bromo-7-methoxyizatin-α-chloride of the formula

thus formed can be obtained by evaporating the solution in a vacuum in the form of dark brown crystals sensitive to moisture.

In many cases an isolation of the nuclear halogenated isatin-α-halide is not necessary; the solution or suspension of the α-halide can be used directly; for example, in the manner usual in the production of indigoid dyestuffs by condensation of suitable components.

Example 2

19,1 parts of 4-methyl-7-methoxyisatin are converted into the 4-methyl-7-methoxyisatin-α-chloride by heating them at 80–85° C. with 22 parts of phosphorus pentachloride and 600 parts of chlorobenzene, to the cooled solution there are added, while stirring, 14 parts of sulfuryl chloride. The whole is then kept for 1 hour at 60–65° C. At the end of this time the chlorination, which occurs with lively evolution of sulfur dioxide, is complete.

If the solvent is in greater part separated, for example by distillation in a vacuum, there is obtained a brown crystalline magma which consists of the 4-methyl-5-chloro-7-methoxyisatin-α-chloride; by filtration and washing with some petroleum ether, the 4-methyl-5-chloro-7-methoxyisatin-α-chloride is isolated.

In like manner the α-halides of 4- or 6- or 7-methylisatin or of 4:7-dimethylisatin may be halogenated.

Example 3

19,5 parts of 4-methyl-7-chlorisatin of the formula

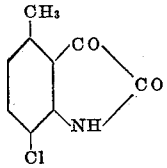

are converted into 4-methyl-7-chlorisatin-α-chloride by stirring them for half-an-hour at 95–100° C. with 22 parts of phosphorus pentachloride and 500 parts of chlorobenzene. After it has cooled to about 50–55° C., the solution is mixed with 14 parts of sulfuryl chloride; after stirring for 2-3 hours at 60-65° C., the chlorination is complete.

By separating the greater part of the solvent, for instance by distilling in a vacuum, there is produced a brown crystalline magma of 4-methyl-5:7-dichlorisatin-α-chloride of the formula

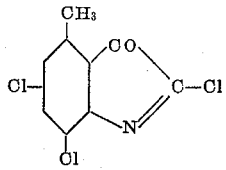

By a rapid filtration and washing with petroleum ether the product may be isolated.

It is clear from the foregoing examples that the process according to the present invention obviates the necessity for isolating the isatin-α-halides produced by the halogenation of the initial isatins, and makes it possible to effect the nuclear halogenation of the said halides directly following the production thereof.

What I claim is:—

1. A process for the production of nuclear-halogenated isatin-α-halides comprising first producing an isatin-α-halide of the general formula

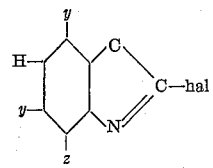

wherein at least one $y$ is a member of the group of substituents consisting of methyl, alkoxy and alkylmercapto, wherein the alkyl radical belongs to the lower aliphatic series, and $z$ is a member of the group of substituents consisting of halogen, alkoxy and alkylmercapto, wherein the alkyl radical belongs to the lower aliphatic series, by subjecting the correspondingly-substituted isatin to the action of a halogenating agent whereby the said isatin-α-halide is formed, and then subjecting the resultant material to the action of a second halogenating agent to effect nuclear halogenation.

2. A process for the production of nuclear-halogenated isatin-α-chlorides comprising first producing an isatin-α-chloride of the general formula

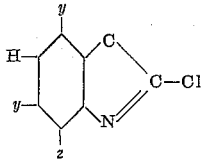

wherein at least one $y$ is a member of the group of substituents consisting of methyl, alkoxy and alkylmercapto, wherein the alkyl radical belongs to the lower aliphatic series, and $z$ is a member of the group of substituents consisting of halogen, alkoxy and alkylmercapto, wherein the alkyl radical belongs to the lower aliphatic series, by subjecting the correspondingly-substituted isatin to the action of a chlorinating agent whereby the said isatin-α-chloride is formed, and then subjecting the resultant material to the action of a second halogenating agent to effect nuclear halogenation.

3. A process for the production of nuclear-chlorinated isatin-α-chlorides comprising first producing an isatin-α-chloride of the general formula

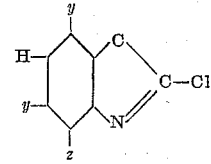

wherein at least one $y$ is a member of the group of substituents consisting of methyl, alkoxy and alkylmercapto, wherein the alkyl radical belongs to the lower aliphatic series, and $z$ is a member of the group of substituents consisting of halogen, alkoxy and alkylmercapto, wherein the alkyl radical belongs to the lower aliphatic series, by subjecting the correspondingly-substituted isatin to the action of a chlorinating agent whereby the said isatin-α-chloride is formed, and then subjecting the resultant material to the action of a second chlorinating agent to effect nuclear chlorination.

4. A process for the production of nuclear-chlorinated isatin-α-chlorides comprising first producing an isatin-α-chloride of the general formula

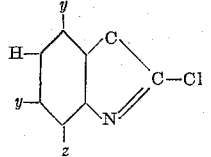

wherein at least one $y$ is a member of the group of substituents consisting of methyl, alkoxy and alkylmercapto, wherein the alkyl radical belongs to the lower aliphatic series, and $z$ is a member of the group of substituents consisting of halogen, alkoxy and alkylmercapto, wherein the alkyl radical belongs to the lower aliphatic series, by subjecting the correspondingly-substituted isatin to the action of phosphorus pentachloride whereby the said isatin-α-chloride is formed, and then subjecting the resultant solution to the action of a second chlorinating agent to effect nuclear chlorination.

5. Process for the manufacture of 4-methyl-5-chloro-7-methoxyisatin-α-chloride, consisting in causing sulfuryl-chloride to react with 4-methyl-7-methoxyisatin-α-chloride of the formula

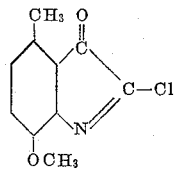

EDUARD KAMBLI.